(12) United States Patent
Szakola et al.

(10) Patent No.: US 8,192,818 B2
(45) Date of Patent: Jun. 5, 2012

(54) SANDWICH ELEMENT

(75) Inventors: Arkadiusz Szakola, Zielona Gora (PL); Peter Nowack, Gelsenkirchen (DE)

(73) Assignee: Rockwool International A/S

(*) Notice: Subject to any disclaimer, the term of this patent is extended or adjusted under 35 U.S.C. 154(b) by 851 days.

(21) Appl. No.: 12/161,656

(22) PCT Filed: Jan. 26, 2007

(86) PCT No.: PCT/DK2007/000036
§ 371 (c)(1),
(2), (4) Date: Dec. 5, 2008

(87) PCT Pub. No.: WO2007/085260
PCT Pub. Date: Aug. 2, 2007

(65) Prior Publication Data
US 2010/0297380 A1    Nov. 25, 2010

(30) Foreign Application Priority Data
Jan. 26, 2006    (DK) .............................. 2006 00118

(51) Int. Cl.
*B32B 3/18*    (2006.01)
*E04C 2/296*    (2006.01)

(52) U.S. Cl. .......................................... 428/60; 428/74
(58) Field of Classification Search ............... 428/60, 428/74, 75; 52/794.1, 592.1
See application file for complete search history.

(56) References Cited

U.S. PATENT DOCUMENTS
5,262,217 A * 11/1993 Blaauw ........................... 428/49

FOREIGN PATENT DOCUMENTS

| CH | 584 108 | 1/1977 |
|---|---|---|
| FR | 2 352 120 | 12/1977 |
| WO | WO-92/10625 | 6/1992 |
| WO | WO-97/36034 | 10/1997 |
| WO | WO-99/47764 | 9/1999 |
| WO | WO-02/099213 | 12/2002 |
| WO | WO-2005/124048 | 12/2005 |

OTHER PUBLICATIONS

Machine translation of FR 2352120, Dec. 1, 2011.*
International Preliminary Report on Patentability for International Application No. PCT/DK2007/000036, dated Ma 26, 2008.
International Search Report for International Application No. PCT/DK2007/000036, dated Jun. 1, 2007.
Written Opinion for International Application No. PCT/DK2007/000036, dated Jun. 1, 2007.

* cited by examiner

*Primary Examiner* — Alexander Thomas
(74) *Attorney, Agent, or Firm* — Marshall, Gerstein & Borun LLP (57) ABSTRACT

A longitudinal sandwich element including a core of binder fixed mineral wool lamellae assembled in a side by side relationship extending in the longitudinal direction of the sandwich element, the core having two major surfaces substantially parallel to each other, and two end surfaces substantially perpendicular to the major surfaces and parallel to each other and two side surfaces interconnecting the major surfaces and the end surfaces, where the mineral wool fibers are mainly perpendicular to the major surfaces, and at least one sheet is attached to at least one of the major sides of the core, and at least one of the two side surfaces is provided by one or more side lamellae, and where at least one of the side surfaces has been formed as a cut section into the one or more side lamella(s), the cut section fitting into a mating cut section of one or more other side lamella(s) of an adjacent sandwich element, and where each side lamella has a varying density and the cut section is in the region with the higher density.

7 Claims, 5 Drawing Sheets

SANDWICH ELEMENT

BACKGROUND

1. Field of the Disclosure

This disclosure relates to a sandwich element with a core of mineral wool, and a surface sheet layer, e.g. of metal on each side. The sandwich element comprises adjacently disposed lamellae, where the fiber direction is substantially in a direction perpendicular to the surface of the sheet layer, also denoted the major surface. Sandwich elements of the present disclosure are mounted in connection with each other along one or more side surfaces of the sandwich elements and the side surfaces are cut to facilitate such mounting, e.g. by cutting groove-and-tongue structures in the side surfaces of the elements.

Sandwich elements of mineral wool with a preferred fiber orientation perpendicular to the major surfaces of the element may be used as insulating elements and as fire proof elements. The preferred fiber orientation implies an improved load bearing capacity and the elements may therefore also be used for exterior insulation of roofs and/or building fronts and insulation of floors, and supporting walls because the elements possess a sufficient stiffness or strength and/or insulating property.

These elements are used for the construction of houses, larger buildings such as industrial facilities, production facilities, sport facilities, wholesale/retail outlets, exhibition halls, offices, worker facilities, service outlets, hangars, garages, workshops, administrative buildings, public utility buildings, off-shore constructions, cooling room constructions, storage compartments, and containers.

2. Review of Prior Art

EP0699256 discloses a sandwich element comprising a mineral wool core with sheets attached to each of the major sides of the core. The side surfaces of the elements form a tongue-and groove structure formed from the sheets. The mineral wool core is left uncovered at least over a part of the side surfaces to assure a proper thermal insulation across the joint at the side surfaces between two mounted elements. When the elements are mounted using the tongue-and-groove, the uncovered edges of the mineral wool core remain resting against each other.

This contact between wool in the joint is important for the sake of thermal insulation, and to counteract fire spreading. The mineral wool core of the element is fire-resistant, but crevices may appear in the joint structure that deteriorates the fire resistance performance. Strict manufacturing tolerances are required to enable the core sections of the elements to be jointed tightly with each other. The mineral wool core is made compressible at the joint area. According to a specific embodiment of this concept, the mating area in the joint is provided with a separate sealer strip of more resilient (softer) mineral wool than that used in the element core. According to another embodiment, the joint edge of the element core is severed to include cuts extending toward the interior of the element core and running parallel with the side surface of the element. The purpose of such cuts is again to reduce the compressive strength and to give the element core a greater compressive resilience at its joint side surface.

It is in general known to be a problem to manufacture cuts in the side surfaces such as groove-and-tongue structures in mineral wool which can fullfil the required tolerances, because the cutting tools are subjected to wear in the metallic parts. The result of using such cutting machinery which has been subjected to wear by cutting in the abrasive mineral wool is that the tongue-and-grooves part structures of the side surfaces of the element become ill-defined and crevices and variations in the side surface results. This again, leads to a build-up of thermal bridges because there is no direct wool-wool contact across the tongue-and-groove joint when two adjacent sandwich elements are connected to each other. The cutting machinery therefore requires frequent maintenance to provide the strict tolerances of the cut surface in the mineral wool.

SUMMARY

It is an object of the present disclosure to provide a sandwich element with a mineral wool core of binder fixed mineral wool lamella, and with cut side surfaces, and where the cut surface provides a smooth and/or mechanically robust surface for connecting one sandwich element to an adjacent sandwich element.

This object is achieved by a longitudinal sandwich element comprising a core of binder fixed mineral wool lamellae assembled in a side by side relationship extending in the longitudinal direction of the sandwich element, the core having two major surfaces substantially parallel to each other, and two end surfaces substantially perpendicular to the major surfaces and parallel to each other and two side surfaces interconnecting the major surfaces and the end surfaces, where the mineral wool fibers are mainly perpendicular to the major surfaces, and at least one sheet is attached to at least one of the major sides of the core, and at least one of the two side surfaces is provided by one or more side lamellae, and —where at least one of the side surfaces has been formed as a cut section into the one or more side lamella(s) said cut section being capable to fit into a mating cut section of one or more other side lamella(s) of an adjacent sandwich element, and where each side lamella has a varying density and the cut section is comprised in the region with the higher density.

The sandwich element is also often referred to as a sandwich panel. Lamellae having a high density region have shown to be of great value for enabling a smooth surface when cutting tools are used to cut e.g. a tongue-and-groove section into the lamella. The lamellae having a varying density are assembled at the edges of the longitudinally extending sandwich element and are thus defined as side lamellae. The other lamellae of the longitudinally extending sandwich element are conventional mono density lamellae. The cut is made into the high-density region of the side lamella. It would normally not be advisable to use a high density lamella because a mineral wool with a high density has a detrimental effect on the thermal properties compared to mineral wool with lower density, and the density of the wool core should be minimized to the extent that it has an adequate load bearing capability.

Once the cut is formed in the high density region, the meticulously cut profile, shows a high resistance to mechanical impacts occurring during transport and handling of the side lamellae and the sandwich elements comprising the side lamellae. The high density region of the side lamellae shows an improvement over conventional lamellae which are more susceptible to damage of edges and side surfaces during handling.

The proportion of the high density region is minimized by using a side lamella with a varying density where the high density region with the enhanced mechanical strength is integral with a low density region having the conventional qualities of a high thermal insulation and low weight.

The cut may be formed of notches into the mineral wool of the side lamella to provide various grooves and tongue structures. The notches are made into the high density region and the notches may be extending in their depth direction only partly into the high density region. The notches may also extend from the side surface of the side lamella into the high density region and across the border between the high density region and partly into the low density region.

The mineral wool may be made from a mineral melt in a conventional manner. Generally the fibers are made by a centrifugal fiber forming process. For instance the fibers may be formed by a spinning cup process in which the melt is thrown outwardly through perforations in a spinning cup, or melt may be thrown off a rotating disc and fiber formation may be promoted by blasting jets of gas through the melt, or fiber formation may be conducted by pouring the melt onto the first rotor in a cascade spinner. Binder or other additives may be added to the cloud of fibers by known means.

Preferably the melt is poured onto the first of a set of two, three or four rotors each of which rotates about a substantially horizontal axis whereby melt on the first rotor is primarily thrown onto the second (lower) rotor although some may be thrown off the first rotor as fibers, and melt on the second rotor is thrown off as fibers although some may be thrown towards the third (lower) rotor, and so forth.

The mineral wool may be rock wool, glass wool or slag wool.

The fiber web formed by the fiberising process, optionally distributed in parallel planes by a pendulum, is cut longitudinally into lamellae and the lamellae thus formed are turned 90° about their longitudinal axis where after the lamellae thus oriented are bonded together to form a web-like product which is then cut into desired lengths to form board elements. Due to the turning of the lamellae the fibers of the finished boards will predominantly be oriented in a plane perpendicular to the surfaces of the boards and as a result thereof boards having a considerable stiffness and strength perpendicularly to the surfaces of the boards are obtained. The boards are thereafter applied with a sheet on one or both sides, the sheet being a steel plate or plastic or wood plate.

In one embodiment the side lamella(s) comprises at least two distinctive layers of wool having different densities, wherein the layer with the highest density faces towards the side surface.

The side lamellae may be cut from a dual density board which is a mineral wool board manufactured by a basic principle of: firstly, splitting a fiber web longitudinally in an upper and a lower sub-web; secondly, compressing the upper web to obtain a higher density; thirdly, rejoining the upper and the lower webs; fourthly, curing the combined web to form a mineral wool board with two densities. The initial fiber web is uncured and the joining and adhesion of the two sub-webs to each other is ensured by the curing which enables the two sub-webs to be integral with each other.

The side lamellae may also be manufactured by other means than the basic principle for producing a dual density board. The low density mineral wool part and the high density mineral wool part may be assembled in any other way, such as by assembling a cured low density mineral wool part with a cured high density mineral wool part to form the board. This assembly may also be carried out off-line. The lamellae are thereafter cut from the board obtained from the assembling of mineral wool parts of different densities.

When the layer with the higher density is distinctive from the layer with the lower density it is easier to assure to what extent the cutting is being done in the high density region of the mineral wool. This provides a quicker quality control of the manufactured sandwich element.

In one embodiment the density of one layer is from 80 to 140 $kg/m^3$ and the density of the at least one other layer is from 160 to 250 $kg/m^3$. In one embodiment the density of one layer is from 100 to 130 $kg/m^3$ and the density of the at least one other layer is from 180 to 220 $kg/m^3$. The one layer may have a layer thickness in the interval of 6 to 9 cm, such as 7 to 9 cm and the at least one other layer may have a layer thickness in the interval of 0.5 to 4 cm, such as 1 to 3 cm.

In one embodiment the side lamella has a density which varies smoothly from the higher to the lower density along a direction from the side surface inwards into the core. This may be advantageous when it is of particular importance to minimize the weight of the sandwich element but still retain the possibility to make a well defined side surface profile by cutting.

In one embodiment the number of lamellae and side lamella(s) counted from one side surface to the other side surface, is between 4 and 8, such as between 5 and 7.

In one embodiment the cut section into the side lamella(s) comprise a groove structure and/or a tongue structure.

In one embodiment the at least one sheet attached to at least one of the major sides of the core is formed to partly cover the groove and/or tongue structure.

Another object of the present disclosure is to provide a binder fixed mineral wool lamella having a well-defined cut section without unwanted crevices and defects.

The lamella is meant to be assembled with other lamellae to form a sandwich element and the lamella is assembled as a side lamella extending in the longitudinal direction of the sandwich element at the edges of the sandwich element.

This object is achieved by an elongated lamella of binder fixed mineral wool suitable as a side lamella extending along the side of a longitudinal sandwich element, the lamella having two parallel surfaces suitable for forming part of the major surfaces of the element and one surface suitable for forming part of the side surfaces of the element, where the mineral wool fibers are substantially perpendicular to the two parallel surfaces, said lamella (6) having a varying density, and
where the density of the mineral wool varies from a higher to a lower density in a direction perpendicular to the one surface and parallel to the two parallel surfaces.

In one embodiment the elongated lamella comprises at least two distinctive layers of wool having different densities, where the one surface is a limiting surface for the higher density layer of the lamella.

The strength of the interface between the high density layer and the low density layer of the lamella shows an improvement when the wool layers have been pressed together during curing of the mineral wool binder. This curing process occurs e.g. when producing a dual density board where two uncured wool layers of different densities are pressed together and subsequently the mineral wool binder is cured. When the interface between the two layers with different densities is bound as the result of a curing of the mineral wool binder, it makes the high density layer integral with the low density layer. The high interface strength ensures that the lamella does not tend to delaminate, especially when subjected to the cutting machinery to make a cut section, e.g. a tongue-and-groove section, into the high density layer.

In one embodiment of the elongated lamella, the density of one layer is from 80 to 140 $kg/m^3$ and the density of the at least one other layer is from 160 to 250 $kg/m^3$. In one embodiment the density of one layer is from 100 to 130 $kg/m^3$ and the density of the at least one other layer is from 180 to 220 $kg/m^3$. The one layer may have a layer thickness in the interval of 6 to 9 cm, such as 7 to 9 cm and the at least one other layer may have a layer thickness in the interval of 0.5 to 4 cm, such as 1 to 3 cm.

In one embodiment of the elongated lamella, the density of the lamella varies smoothly from the higher to the lower density along a direction from the one surface suitable for forming part of the side surfaces of the element, perpendicular to the longitudinal direction of the elongated lamella, and parallel with the two parallel surfaces.

Another object of the present disclosure is to provide a method of making a longitudinal sandwich element having a core of mineral wool lamellae where at least one of the side surfaces of the sandwich element has been formed as a well-defined cut section without unwanted crevices and defects.

This object is achieved by a method of making a longitudinal sandwich element having a core comprising binder fixed mineral wool lamellae with the mineral wool fibers are being mainly perpendicular to the major surfaces of the sandwich element, said method comprising the steps of:
  cutting lamellae having a substantially homogenous density from a first mineral wool board, and
  cutting lamellae having a varying density from a second mineral wool board, and —assembling the lamellae in a side by side relationship extending in the longitudinal direction of the sandwich element to form a core, and
  arranging the lamellae with varying density as side lamellae which extends along the side of the sandwich element, and
  forming a cut section into the one or more side lamella(s) said cut section being capable to fit into a mating cut section of one or more other side lamella(s) of an adjacent sandwich element and the cut section is provided in the region of the side lamellae with the higher density, and
  attaching at least one sheet to at least one of the major sides of the core.

BRIEF DESCRIPTION OF THE DRAWINGS

In the following, by way of examples only, the invention is further disclosed with detailed description of preferred embodiments. Reference is made to the drawings in which.

DETAILED DESCRIPTION OF THE PREFERRED EMBODIMENTS

Figure 1:
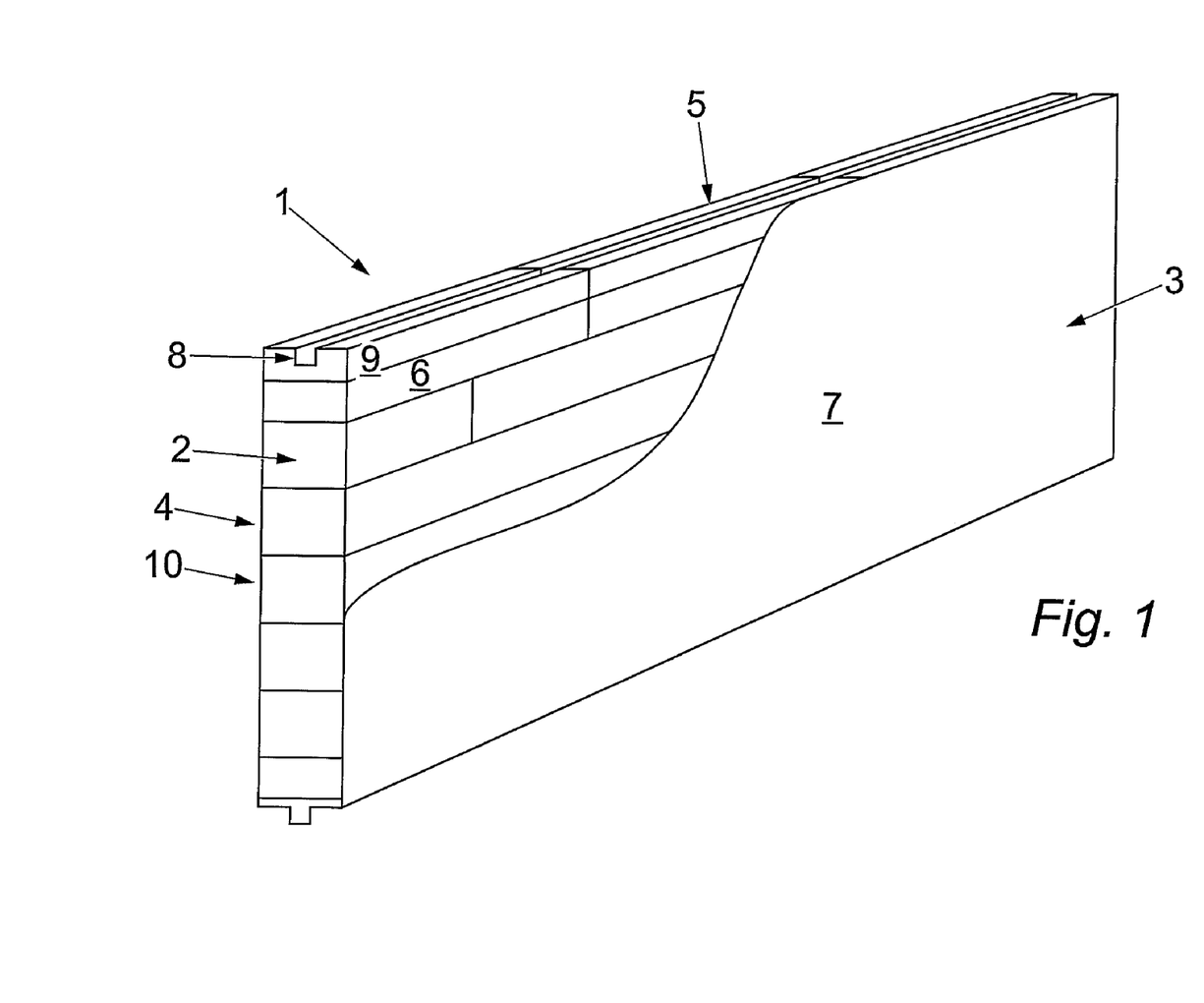
FIG. 1 shows an embodiment of the present invention illustrating a sandwich panel seen in perspective with an exploded view showing the core underneath the sheet.

FIG. 1 shows an embodiment of the present invention illustrating a sandwich panel seen in perspective with an exploded view showing the core 10 underneath the sheet 7. The sandwich element 1 consists of a core of mineral wool which is assembled of seven lamellae 2 with a width of seven lamellae 2 visible from the end surface 4 of the sandwich panel. The lamellae 2 have been cut longitudinally from a fiber web and the lamellae 2 thus formed have been turned 90° about their longitudinal axis where after the lamellae 2 thus oriented have been bonded together to form the core 10. The core 10 has then been cut into the desired length for a sandwich panel. A sheet constituted by a steel plate 7 has been applied by gluing to both of the major surfaces 3 of the core 10; only one steel plate 7 is visible in FIG. 1. The fibers are predominantly oriented in a plane perpendicular to the major surfaces of the core, and thus also perpendicular to the steel plates 7. As a result thereof elements 1 having a considerable stiffness and strength perpendicularly to the surfaces of the element 1 are obtained. The side lamellae 6 are seen as the lamellae 2 with their side surfaces 5 facing upwards and a groove section represent the cut section into the side lamella 6. There are two side surfaces 5 of the element 1 and only one side surface 5 is visible.

The side lamellae 6 show a distinctive high density region illustrated as a dark region of the side lamella 6 and a low density region illustrated as a light region. The side lamella 6 has been cut from a dual density board which is a mineral wool board manufactured by a basic principle of: firstly, splitting a fiber web longitudinally in an upper and a lower sub-web; secondly, compressing the upper web to obtain a higher density; thirdly, re-joining the upper and the lower webs; fourthly, curing the combined web to form a mineral wool board with two densities. The density of the high density region is around 200 $kg/m^3$ and the density of the low density region is around 120 $kg/m^3$.

A groove-and-tongue cut is schematically shown in FIG. 1. The side surface 5 facing upwards is made as a groove cut section 8 into the upper side lamellae 6 and the side surface facing downwards (not shown) is made as a tongue cut section into the lower side lamellae. Both the groove and the tongue are made into the high density region 9 of the side lamellae 5. The notches are made so that they extend into the high density region but not across the border between the high density 9 and low density region 11. The sandwich element is made by applying sheets to each major side of the core 10 made of lamellae 2 assembled in an otherwise unspecified way. In general, there may be a different number of side lamellae 5 in one side of a mineral wool core 10, than for the other side of the mineral wool core 10.

When the sandwich element 1 is to be mounted with another adjacent sandwich element 1 the tongue-and-groove structure of the side lamellae 5 is inserted into a matching tongue-and-groove structure of the adjacent sandwich element 1, e.g. by inserting the notches into matching protrusions in the high density region 9 of the side lamella 5 of the adjacent sandwich element 1.

Figure 2:
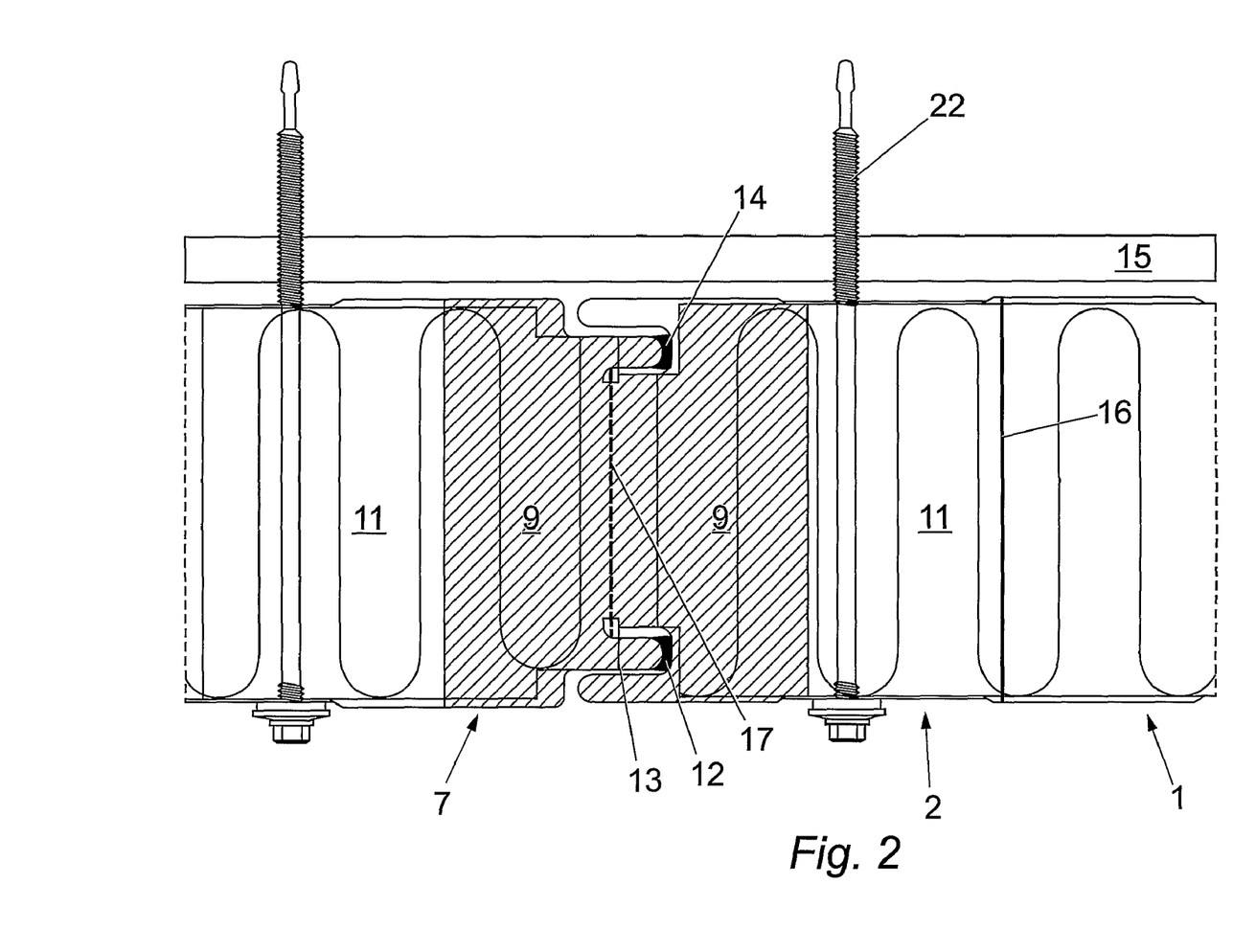
FIG. 2 shows one embodiment of the joint region between two sandwich elements, seen in cross section.

FIG. 2 shows the joint between two sandwich elements 1 for a panel with visible mounting fasteners 22 type. The joint is seen in cross section. The two sandwich panels are joined by a joint, comprising a tongue 13 provided as part of the sheet of one sandwich element 1 and a groove 12 provided as part of the sheet of the other sandwich element 1, where the tongue 13 and groove 12 are designed in this embodiment to fit closely to each other. The tongue 13 and the groove 12 part of the sheets 7 are fitted to the side surfaces of the cut section made of mineral wool and the side surfaces has been formed as a cut section into the side lamellae and the cut section is in the region with the higher density 9 of the side lamella with a varying density. In this embodiment, the side lamellae consist of two distinctive layers of wool having different densities 9, 11. The tongue 13 and the groove 12 part of the sheets 7 may preferably be attached to the side surfaces of the cut section of the mineral wool core.

A sealing member 14 such as a sealing compound is provided in the seam between the tongue 13 and groove 12. The one sandwich panel abuts the other sandwich panel in the region between the grooves-and-tongues and the mineral wool core 10 of the one sandwich element 1 is in contact with the mineral wool core 10 of the other sandwich element 1. The border between the two sandwich elements 1 is depicted as a dotted line 17 and the border between a side lamella 5 with a varying density and a conventional lamella with one density is seen as full line. The two sandwich elements 1 are connected to a frame 15, such as a steel beam, steel column or a ceiling by means of a fastener shown as a screw between each of the sandwich elements 1 taking part of the joint on each side of the joint. The core 10 of mineral wool has a density of 100-150 kg/m$^3$ and the sandwich element 1 has a thickness of 80-140 mm. The width may be around 1100 mm and the maximum length of a sandwich panel assembled by several sandwich elements 1 is from 8 to 12 meters. The sheet 7 is metal, such as steel or aluminium and may be galvanized steel and the sheet thickness is around 0.4-0.7 mm and preferably profiled as striped or microprofiled. The sheets 7 are preferably coated for protection with a compound such as polyester, PVDF, plastisol or PVC foil.

Depending on load capacity and rigidity as well as adopted structural analysis the sandwich panels may serve as curtain walls, partition walls or suspended ceilings.

Figure 3:
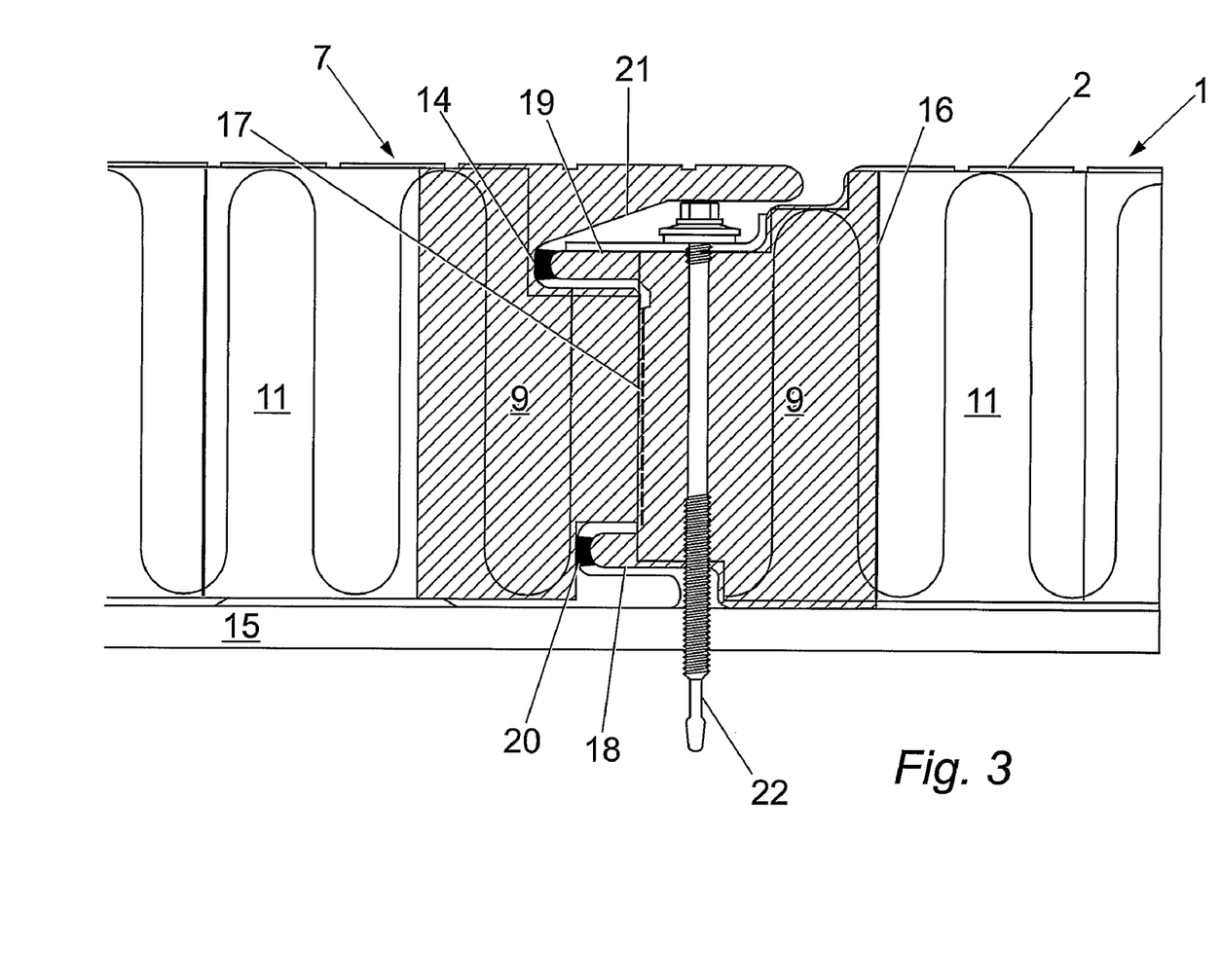
FIG. 3 shows another embodiment of the joint region between two sandwich elements, seen in cross section.

FIG. 3 shows the joint between two sandwich elements 1 for a panel with hidden mounting fasteners 22. The joint is seen in cross section. The two sandwich panels are joined by a joint, comprising a first tongue 18 and a second tongue 19 provided as part of the sheet of one sandwich element 1 and a first and second groove 20, 21 provided as part of the sheet 7 of the other sandwich element 1. The first tongue 18 and the first groove 20 are designed in this embodiment to fit closely to each other. The second tongue 19 and the second groove 21 are designed in this embodiment to fit into to each other and allowing a void between the parts of the second groove 21 and tongue 19 respectively which are co-planar with the external panel surfaces, and where the room between these parts are capable of allowing space for a head of a fastener 22, such as a screw. The tongue and the groove parts of the sheets 7 are fitted to the side surfaces 5 of the cut section 8 made of mineral wool. The tongue and the groove part of the sheets 7 may preferably be attached to the side surfaces 5 of the cut section 8 of the mineral wool core 10. The side surfaces 5 have been formed as a cut section into the side lamellae 6 and the cut section 8 is in the region with the higher density 9 of the side lamella 5 with a varying density. In this embodiment, the side lamellae 6 consist of two distinctive layers of wool having different densities.

A sealing member 14 such as a sealing compound is provided in the seam between the tongue and groove 18, 20; 19, 21 while still allowing a void for a head of a fastener 22 between parts of the second groove 21 and tongue 19 respectively. The one sandwich panel abuts the other sandwich panel in the region between the grooves-and-tongues and the mineral wool core 10 of the one sandwich element 1 is in contact with the mineral wool core 10 of the other sandwich element 1. The border between the two sandwich elements 1 is depicted as a dotted line 17 and the border between a side lamella 6 with a varying density and a conventional lamella with one density is seen as full line 16. The two sandwich elements 1 are connected to a frame 15, such as a steel beam, steel column or a ceiling by means of a fastener 22 shown as a screw through one sandwich panel in the vicinity of the first and second tongue 18, 19. The core of mineral wool has a density of 100-150 kg/m$^3$ and the sandwich element 1 has a thickness of 100-120 mm. The width may be around 1000 to 1100 mm and the maximum length of a sandwich panel assembled by several sandwich elements is from around 12 meters. The sheet 7 is metal, such as steel or aluminium and may be galvanized steel and the sheet thickness is around 0.4-0.7 mm and preferably profiled as striped, grooved, embossed or microprofiled externally. The sheets 7 are preferably coated for protection with a compound such as polyester, PVDF, plastisol or PVC foil.

Depending on load capacity and rigidity as well as adopted structural analysis the sandwich panels may serve as curtain walls, partition walls or suspended ceilings.

Figure 4:
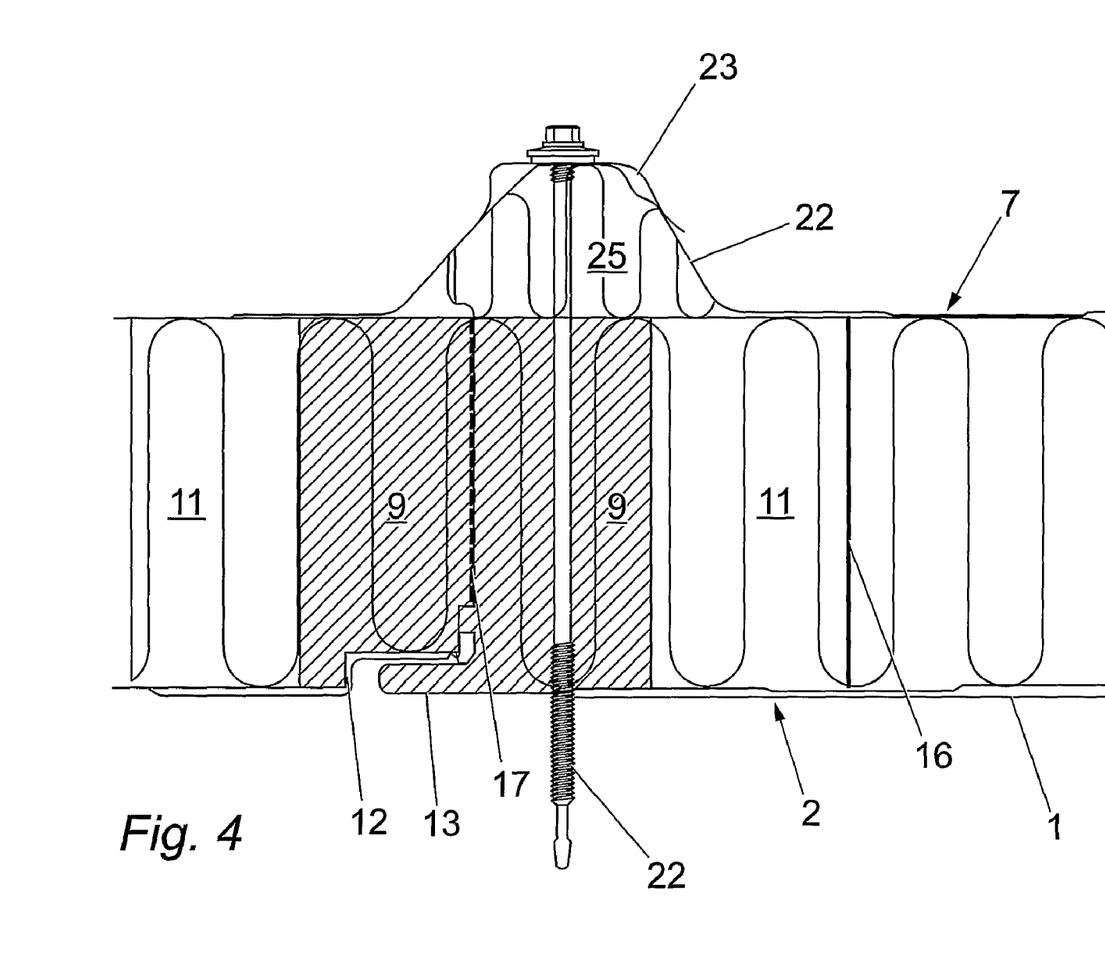
FIG. 4 shows yet another embodiment of the joint region between two sandwich elements, seen in cross section.

FIG. 4 shows the joint between two sandwich elements 1 for a roof sandwich panel. The joint is seen in cross section. The two sandwich panels are joined by a joint comprising a tongue 13 provided as part of the sheet 7 of one sandwich element 1 and a groove 12 provided as part of the sheet 7 of the other sandwich element 1, where the tongue 13 and groove 12 are designed in this embodiment to fit closely to each other and where the groove 12 opens up to the outer surface of the sandwich panel, thus being a half open groove. The tongue 13 and the groove 12 parts of the sheets 7 are fitted to the side surfaces of the cut section 8 made of mineral wool. The tongue 13 and the groove 12 part of the sheets 7 may preferably be attached to the side surfaces 5 of the cut section 8 of the mineral wool core 10. The side surfaces 5 have been formed as a cut section 8 into the side lamellae 6 and the cut section 8 is in the region with the higher density 9 of the side lamella 6 with a varying density. In this embodiment, the side lamellae 6 consist of two distinctive layers of wool having different densities. The joint also comprises a hump profiled sheet part 23 of one sandwich element 1 on top of a hump profiled sheet part 24 of the other sandwich element 1. A joint region of the sandwich panel thus comprises an upper hump profiled sheet part 23 engaging with, and partly covering, a lower hump profiled sheet part 24 at the outer surface of the roof sandwich panel and a groove and tongue joint at the lower part of the roof sandwich panel.

A sealing member 14 such as a sealing compound is provided in the seam between the tongue and groove 13, 12. The one sandwich panel abuts the other sandwich panel in the region between the groove-and-tongue and the hump profiled sheets, and the mineral wool core 10 of the one sandwich element 1 is in contact with the mineral wool core 10 of the other sandwich element 1. The border between the two sandwich elements 1 is depicted as a dotted line 17 and the border between a side lamella 6 with a varying density and a conventional lamella with one density is seen as full line 16. In the embodiment shown in FIG. 4, there is provided a mineral wool filling 25 fitting into the hump profiled lower sheet, thus filling out the void shaped by the sheet. In another embodiment not shown, the void shaped by the hump profiled lower sheet may be left without a filling or a filling of another substance than mineral wool. The two sandwich elements 1 are connected to a frame 15, such as a steel beam, steel column or a purlin by means of a fastener shown as a screw through one sandwich panel through both the upper hump profiled sheet engaging with, and partly covering, the lower hump profiled sheet and through the mineral wool core out into the beam, steel column or purlin. Another embodiment not shown is where furthermore a sealant, e.g. made of PU is applied between the outer surface of the upper hump profiled sheet and a washer held by the fastener.

The core of mineral wool has a density of 100-150 kg/m$^3$ and the sandwich element has a thickness of 100-150 mm and a thickness of 140-190 mm across the part of the sandwich panel where humps are provided. The width may be around 1000 to 1100. The sheet is metal, such as steel or aluminium and may be galvanized steel and the sheet thickness is around 0.4-0.7 mm and preferably profiled as trapezoidal, striped or grooved. The sheets are preferably coated for protection with a compound such as polyester, PVDF, plastisol or PVC foil.

Depending on load capacity and rigidity as well as adopted structural analysis the sandwich panels may serve as curtain walls, partition walls or suspended ceilings.

Figure 5:
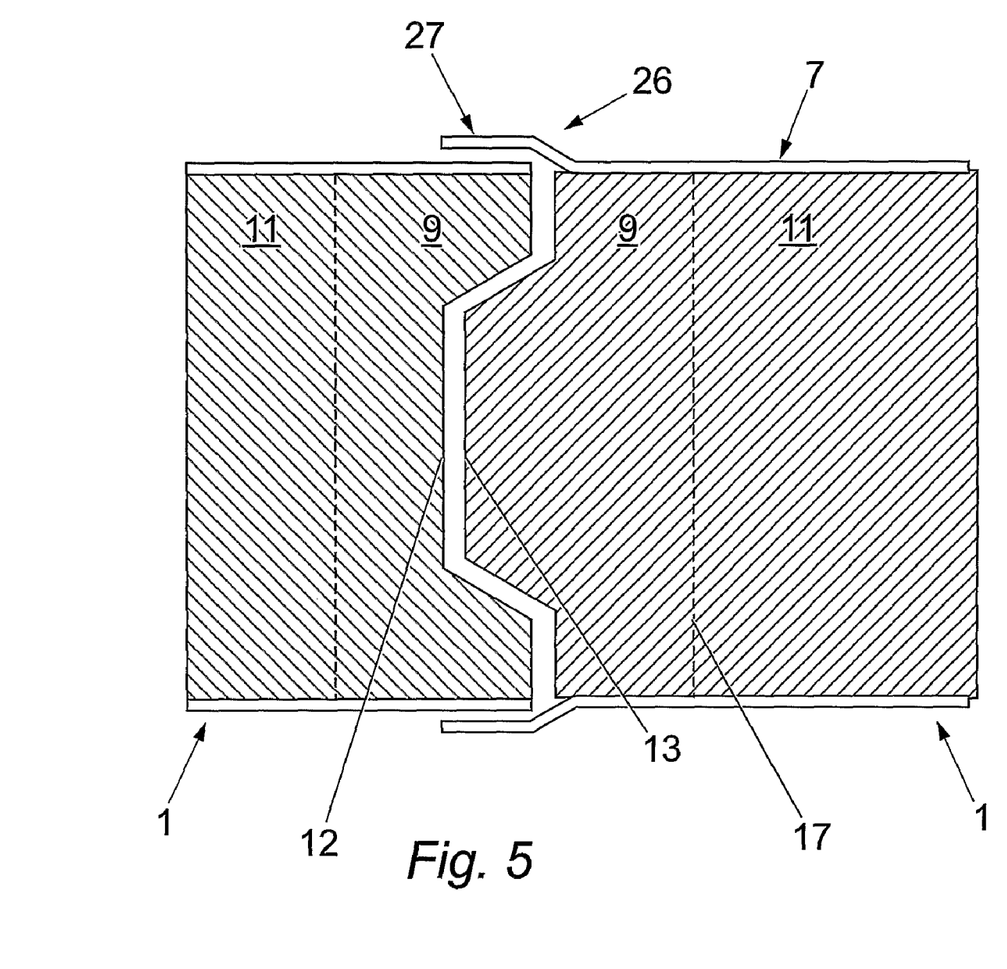
FIG. 5 shows still another embodiment of the joint region between two sandwich elements, seen in cross section.

FIG. 5 shows the joint between two sandwich elements 1 for a panel where the joining of two sandwich elements 1 is made by a welding step. The joint is seen in cross section. The two sandwich panels are joined by a joint, comprising a tongue 13 provided as part of the first sandwich element 1 and a groove 12 provided as part of the other sandwich element 1, where the tongue 13 and groove 12 are designed in this embodiment to fit closely to each other. The joint is only seen indicated as the two sandwich element 1 which are meant to joined are shown slightly separated to aid the illustration of the details of this joint. The side surfaces 5 have been formed as a cut section into the side lamellae 6 and the cut section 8 is in the region with the higher density 9 of the side lamella with a varying density. In this embodiment, the side lamellae consist of two distinctive layers of wool having different densities.

The sheet of one sandwich panel forms a flange 26 protruding from the major surface 3 in small angle to the major surface 3 and showing a member 27 of the flange 26 being substantially parallel to the major surface 3. When two sandwich panels are joined, the flange 26 of one sandwich panel is welded to the sheet of the other sandwich panel. The welding may be performed with any suitable welding technique. The one sandwich panel abuts the other sandwich panel in the region between the grooves-and-tongues when assembled, and the mineral wool core 10 of the one sandwich element 1 is in contact with the mineral wool core 10 of the other sandwich element 1 when assembled.

The sheet may be a metal, such as steel, stainless steel or aluminium and may be galvanized steel and are preferably coated for protection with a compound such as polyester, PVDF, plastisol or PVC foil.

Depending on load capacity and rigidity as well as adopted structural analysis the sandwich panels may serve as elements within the food industry and for clean rooms, cooling facilities and chambers enabling a well-defined humidity, pressure and temperature.

Figure Numerals
longitudinal sandwich element (1)
lamellae (2)
major surfaces (3)
end surfaces (4)
side surfaces (5)
side lamellae (6)
sheet (7)
cut section (8)
region (9) with the higher density. core (10)
region (11) with the lower density.
groove (12)
tongue (13)
sealing member 14
frame 15
full line 16
dotted line 17
first tongue 18
second tongue 19
first groove 20
second groove 21
fastener 22
upper hump profiled sheet part 23
lower hump profiled sheet part 24
mineral wool filling 25
flange 26
member 27

The invention claimed is:

1. A longitudinal sandwich element (1) comprising a core (10) of binder fixed mineral wool lamellae (2) assembled in a side by side relationship extending in the longitudinal direction of the sandwich element (1), the core (10) having two major surfaces (3) substantially parallel to each other, and two end surfaces (4) substantially perpendicular to the major surfaces (3) and parallel to each other and two side surfaces (5) interconnecting the major surfaces (3) and the end surfaces (4), where the mineral wool fibers are mainly perpendicular to the major surfaces (3), and at least one sheet (7) is attached to at least one of the major sides (3) of the core (10), and at least one of the two side surfaces (5) is provided by one or more side lamellae (6), and where at least one of the side surfaces (5) has been formed as a cut section (8) into the one or more side lamella(s) (6) said cut section (8) being capable to fit into a mating cut section (8) of one or more other side lamella(s) (6) of an adjacent sandwich element (1), where each side lamella (6) has a varying density and the cut section (8) is comprised in the region (9) with the higher density, where the lamellae (2) in the core have a substantially homogeneous density, and where the side lamella has a density which varies smoothly from the higher to the lower density along a direction from the side surface inwards into the core.

2. A sandwich element according to claim 1, where the side lamella(s) comprising at least two distinctive layers of wool having different densities, wherein the layer with the highest density faces towards the side surface.

3. A sandwich element according to claim 2, where the density of one layer is from 80 to 140 kg/m$^3$ and the density of the at least one other layer is from 160 to 250 kg/m$^3$.

4. A sandwich element according to claim 1, where the number of lamellae and side lamella(s) counted from one side surface to the other side surface, is in a range of 4 to 8.

5. A sandwich element according to claim 4 where the number of lamellae and side lamella(s) counted from one side surface to the other side surface, is in a range of 5 to 7.

6. A sandwich element according to claim 1, where the cut section into the side lamella(s) comprise at least one of a groove structure and a tongue structure.

7. A sandwich element according to claim 6, where the at least one sheet attached to at least one of the major sides of the core is formed to partly cover the groove and/or tongue structure.

* * * * *